(12) United States Patent
Groh et al.

(10) Patent No.: US 8,200,784 B2
(45) Date of Patent: Jun. 12, 2012

(54) METHOD AND COMPUTER SYSTEM FOR UNSTRUCTURED DATA INTEGRATION THROUGH GRAPHICAL INTERFACE

(75) Inventors: Andrew Groh, Burlington, MA (US); Rob Surratt, Arlington, MA (US); Marc Harris, Arlington, MA (US); Mikhail Gurevich, Newton, MA (US)

(73) Assignee: Open Text S.A., Luxembourg (LU)

( * ) Notice: Subject to any disclaimer, the term of this patent is extended or adjusted under 35 U.S.C. 154(b) by 324 days.

(21) Appl. No.: 12/547,962

(22) Filed: Aug. 26, 2009

(65) Prior Publication Data

US 2009/0319930 A1 Dec. 24, 2009

Related U.S. Application Data

(63) Continuation of application No. 10/427,820, filed on May 1, 2003, now Pat. No. 7,600,001.

(51) Int. Cl.
*G06F 15/16* (2006.01)
(52) U.S. Cl. ......... 709/218; 709/217; 715/234; 715/713
(58) Field of Classification Search .......... 709/217–218; 715/234, 713
See application file for complete search history.

(56) References Cited

U.S. PATENT DOCUMENTS

| | | | | |
|---|---|---|---|---|
| 5,353,355 A * | 10/1994 | Takagi et al. | ................. | 382/111 |
| 5,555,362 A * | 9/1996 | Yamashita et al. | ............ | 715/209 |
| 6,618,725 B1 * | 9/2003 | Fukuda et al. | .......................... | 1/1 |
| 6,874,141 B1 | 3/2005 | Swamy et al. | | |
| 7,065,483 B2 * | 6/2006 | Decary et al. | ..................... | 704/7 |
| 7,181,734 B2 | 2/2007 | Swamy et al. | | |
| 7,272,594 B1 * | 9/2007 | Lynch et al. | .......................... | 1/1 |
| 7,600,001 B1 | 10/2009 | Groh et al. | | |
| 2002/0169823 A1 * | 11/2002 | Coulombe et al. | ............ | 709/203 |
| 2002/0194379 A1 * | 12/2002 | Bennett et al. | ................ | 709/246 |
| 2003/0037119 A1 * | 2/2003 | Austin | ......................... | 709/217 |
| 2003/0097420 A1 * | 5/2003 | Chitre et al. | .................. | 709/217 |
| 2004/0103116 A1 * | 5/2004 | Palanisamy et al. | ........ | 707/104.1 |
| 2004/0133635 A1 * | 7/2004 | Spriestersbach et al. | ..... | 709/203 |
| 2004/0205613 A1 * | 10/2004 | Li et al. | ......................... | 715/523 |
| 2005/0022115 A1 * | 1/2005 | Baumgartner et al. | ....... | 715/513 |
| 2006/0104511 A1 * | 5/2006 | Guo et al. | ..................... | 382/176 |
| 2007/0011183 A1 * | 1/2007 | Langseth et al. | .............. | 707/101 |
| 2007/0027672 A1 * | 2/2007 | Decary et al. | ..................... | 704/7 |
| 2007/0112843 A1 * | 5/2007 | Swamy et al. | ................ | 707/102 |
| 2007/0203893 A1 * | 8/2007 | Krinsky et al. | ................... | 707/3 |

OTHER PUBLICATIONS

Office Action issued in U.S. Appl. No. 10/427,820 mailed Nov. 1, 2006, 6 pgs. Office Action issued in U.S. Appl. No. 10/427,820 mailed May 1, 2007, 6 pgs.
Office Action issued in U.S. Appl. No. 10/427,820 mailed Oct. 19, 2007, 6 pgs.
Office Action issued in U.S. Appl. No. 10/427,820 mailed Mar. 24, 2008, 6 pgs.

\* cited by examiner

*Primary Examiner* — Mohamed Wasel
(74) *Attorney, Agent, or Firm* — Sprinkle IP Law Group

(57) ABSTRACT

Embodiments disclosed herein provide a system and method for transferring data between an unstructured data source and a structured destination. In one embodiment, graphical representations of a unstructured data source and a structured destination are presented to a user via a graphical user interface of a computer. Using the graphical user interface, the user can draw lines between the graphical representations to indicate how data from the unstructured data source should be associated with and transferred to the structured destination. The graphical representation of the unstructured data source may be generated using data extracted from a web based document. This data extraction can be done recursively and at least partially in parallel with retrieving files associated with hyperlinks within the web based document.

20 Claims, 4 Drawing Sheets

METHOD AND COMPUTER SYSTEM FOR UNSTRUCTURED DATA INTEGRATION THROUGH GRAPHICAL INTERFACE

CROSS-REFERENCE TO RELATED APPLICATION(S)

This is a continuation of U.S. patent application Ser. No. 10/427,820, filed May 1, 2003, now allowed, entitled "METHOD AND COMPUTER SYSTEM FOR UNSTRUCTURED DATA INTEGRATION THROUGH A GRAPHICAL INTERFACE," which is fully incorporated herein by reference.

TECHNICAL FIELD OF THE DISCLOSURE

This invention relates generally to transferring data between two locations, and more particularly, to extracting data from an unstructured data source and transferring this data to a structured destination using graphical tools to define the mapping of the data from the source to the destination.

BACKGROUND OF THE INVENTION

Throughout the world of computer data systems, a lack of standardization is often times problematic. Different operating systems, applications, and file formats conspire to create barriers against the transfer of data between systems. These barriers are particularly germane to the field of computerized data representation and storage.

Data can be stored, represented, and displayed in many different formats. These diverse formats can be loosely grouped into three broad categories: highly structured documents, unstructured documents, and indecipherable documents. Documents which are highly structured, such as a set of tables in a relational database, an XML document governed by a DTD or Schema, or data coming out of SAP, have data that is easily readable by both humans and machines. This data can therefore be extracted and transferred between documents with dissimilar formats with little or no difficulty.

Conversely, documents which fall into the indecipherable category, such as an Adobe Postscript files generated by printing a Microsoft Word document to a file, or a JPEG image that happens to contain text, have data that might be easily readable by humans. But data from these indecipherable documents is virtually impossible to put into a machine readable format, greatly hindering the transfer of this data between documents.

The increasing prevalence of documents which have been created to be displayed on the World Wide Web, however, means the most interesting, and largest, category of documents are those that fall under the rubric of unstructured documents. These documents are ones that have data which is human readable, but impose no well defined structure on that data. Nonetheless, data can be extracted and transferred between these documents, despite the lack of a well defined structure. Examples of such unstructured documents are HTML pages with hierarchical header tags, HTML pages with tables, or an XML document with no DTD or Schema.

It is often desirable to transfer data from data sources to a destination. To transfer data between the source and destination, data must be extracted from the source which contains them and represented in some manner. Additionally, the destination to which the data is to be transferred must be represented. After both the source and destination are represented a mapping must be constructed between data in the source and the corresponding location in the destination to which the data is to be transferred.

Because of the pervasiveness of unstructured documents, and the volume of data which they contain, there is a need to provide a means to transfer data from these unstructured sources to destinations where this data can be better manipulated and utilized. Moreover, because these unstructured documents contain such a large volume of data, there is a need to provide such a means that is simple and easy to use.

SUMMARY OF THE INVENTION

The present invention provides systems and methods for the transfer of data between data systems, the various embodiments of which may substantially eliminate or reduce the disadvantages and problems associated with previously developed systems and methods.

More specifically, one embodiment of the present invention provides a method for transferring data between an unstructured data source and a structured destination. The data transfer method includes extracting data from an unstructured data source, graphically representing the data in the unstructured data source, graphically representing the destination, graphically depicting how data is to be transferred between the source and the destination, and transferring the data according to the graphical depiction of the desired transfer.

Another embodiment of the present invention includes the method of extracting data from an unstructured data source, generating a graphic representation of the hierarchy of the data source in a tree, generating a graphic representation of a structured destination, graphically depicting how the data is to be transferred from the unstructured data source to the structured destination by graphically associating nodes of the two tree representations, and transferring the data according to the graphical depiction of the desired transfer.

One embodiment of the present invention offers an important technical advantage by providing a recursive method for extracting data from an unstructured data source by navigating through a web-based document.

Another embodiment of the present invention offers another technical advantage by being able to extract data from an unstructured data source which consists of multiple files.

An additional embodiment of the present invention offers yet another technical advantage by extracting data from a data source via an adapter which can be tailored using a sample file.

DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same components. The invention may be better understood by reference to one or more of these drawings in combination with the description presented herein.

DETAILED DESCRIPTION OF THE INVENTION

Figure 1:
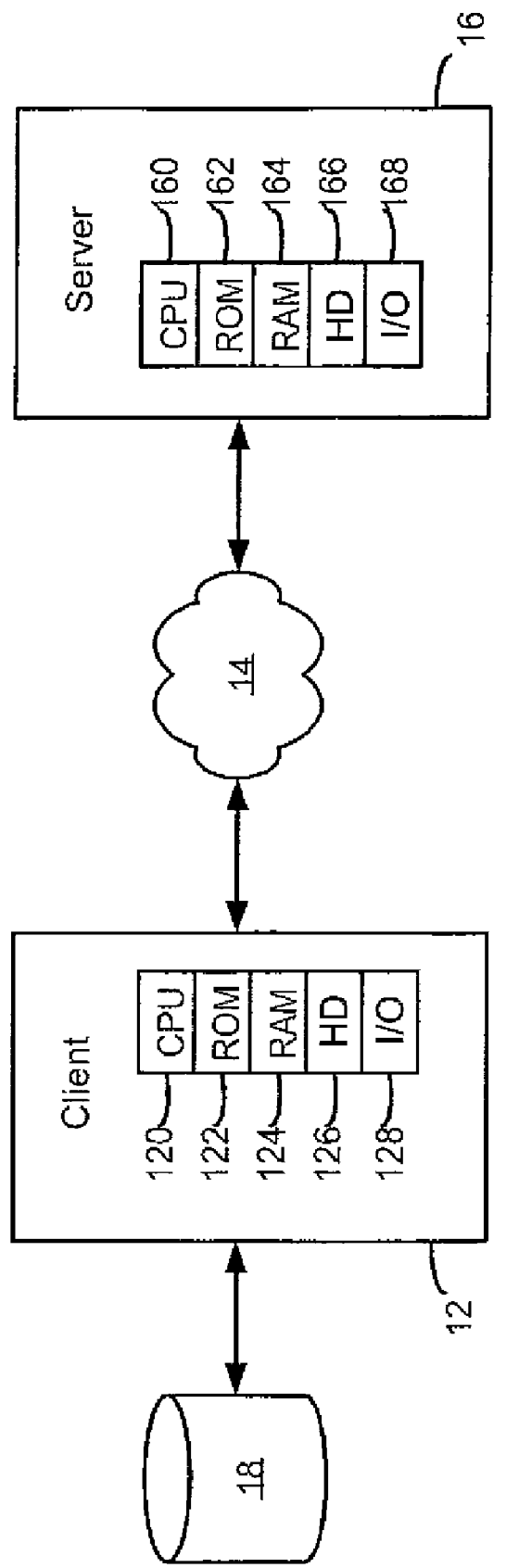
FIG. 1 is an illustration of a client computer and a server computer as part of a computer network.

The invention and the various features and details thereof are explained more fully with reference to the nonlimiting embodiments that are illustrated in the accompanying drawings and detailed in the following description. Descriptions of well known starting materials, processing techniques, components and equipment are omitted so as not to obscure the invention in unnecessary detail. It should be understood, however, that the detailed description and the specific examples, while indicating preferred embodiments of the invention, are given by way of illustration only and not by way of limitation. Various substitutions, modifications, additions and rearrangements within the scope of the underlying inventive concept will become apparent to those skilled in the art from this disclosure. Preferred embodiments of the present invention are illustrated in the figures, like numerals being used to refer to like and corresponding parts of the various drawings.

As used herein, the terms "comprises," "comprising," "Includes," "including," "has," "having" or any other variation thereof are intended to cover a nonexclusive inclusion. For example, a process, method, article, or apparatus that comprises a list of components is not necessarily limited only those components but" may include other components not expressly listed or inherent to such process, method, article, or apparatus.

Generally, the present invention comprises systems and methods for facilitating the transfer of data from an unstructured data source to a structured destination by associating data items in the unstructured source with their respective destinations in the structured destination.

In one embodiment, the data is extracted from an unstructured data source. The data which is extracted from the data source is graphically represented, as is the destination to which the data is to be transferred. Based upon these graphical representations, a graphical depiction of how data is to be transferred from the source to the destination can be created. Data is then transferred based upon this graphical depiction.

In many cases, the most effective way to represent the unstructured data source from which data is extracted, and the destination for that data, is in a tree. Accordingly, in many of those embodiments where the unstructured data source and destination are represented in a tree, graphically depicting how the data is to be transferred from the unstructured data source to the structured destination can be accomplished by forming lines between nodes of the two tree representations. Data can then be transferred based upon the associations created.

Various embodiments of the present invention involve extracting data from an unstructured data source and transferring it to a structured destination. An unstructured data source is a document which contains data which is comprehensible to humans, but which is not easily machine readable, and thus not readily transferable to another locale. Conversely, a structured destination is a document which imposes an order on the data which it contains. The order may be directly related to the type of information the destination contains. Typically, the structured destination may be a database, while the unstructured data source is a web based document. One or more of the methods described herein can extract be used to data from such a web-based document. Because this data can comprise portions of a document or network page, these methods allow a quicker and more automated analysis of a web-based document.

A few terms are defined or clarified below to aid in understanding the descriptions that follow. A web-based document is one that operates over HTTP (or similar) Internet protocol and can be accessed or manipulated using an Internet browser such as Netscape Navigator or Microsoft Internet Explorer. Web-based documents may include Internet applications, E-commerce based systems, extranets, and other similar types of applications that use network based technologies. For purposes of this disclosure, the term web based document includes a web site and its constituent parts, including but not limited to, code, scripts, static and dynamic web pages, documents, and software programs, designed to reside on, and be accessed or utilized via a network such as the Internet. The web based data source from which data is to be extracted and transferred may be code in any standard markup language. The code may be generated at a server computer and transmitted over a network to a client computer. The code can be assembled by a browser for use at a client computer.

A network includes an interconnected set of server and client computers. A network may, for example, be a publicly available medium (e.g., the Internet) or an internal (company-owned) system. A user at a client computer may gain access to a publicly available network using a network access provider. An Internet Service Provider ("ISP") is a common type of network access provider. A network employs network addresses which include information that can be used by a server computer to locate information, whether internal to that server computer or at a different, remote computer or database. Uniform Resource Locators ("URLs") are examples of network addresses.

A network site typically includes documents, network pages, files or other information displayed at different network addresses for that network site. A web site is a common type of network site, and a web page is a common type of network page. The network site may be accessible using a client-server hardware configuration. Documents may consist of the individual software program(s), code files, scripts, etc. A web-based document typically includes a plurality of files that are network pages, and a network domain may include a plurality of web-based documents. Note that the examples given within this paragraph are for purposes of illustration and not limitation.

Before discussing specific embodiments of the invention, an exemplary hardware architecture for using certain embodiments of the present invention is described. FIG. 1 illustrates an exemplary architecture and includes a client computer 12 that is bi-directionally coupled to a network 14 (e.g. the Internet) and database 18, and a server computer 16 that is bi-directionally coupled to the network 14. The client computer 12 includes a central processing unit ("CPU") 120, a read-only memory ("ROM") 122, a random access memory ("RAM") 124, a hard drive ("HD") or storage memory 126, and input/output device(s) ("I/O") 128. The I/O devices 128 can include a keyboard, monitor, printer, electronic pointing device (e.g., mouse, trackball, etc.), or the like. The server computer 16 can include a CPU 160, ROM 162, RAM 164, HD 166, and I/O 168. The server computer 16 may have a cache memory that resides in RAM 164

Each of the client computer 12 and the server computer 16 is an example of a computer system. ROM 122 and 162, RAM 124 and 164, HD 126 and 166, and the database 18 include media that can be read by the CPU 120 or 160. Each of these types of memories comprises a computer system readable medium. These memories may be internal or external to the computers 12 and 16.

Figure 2:
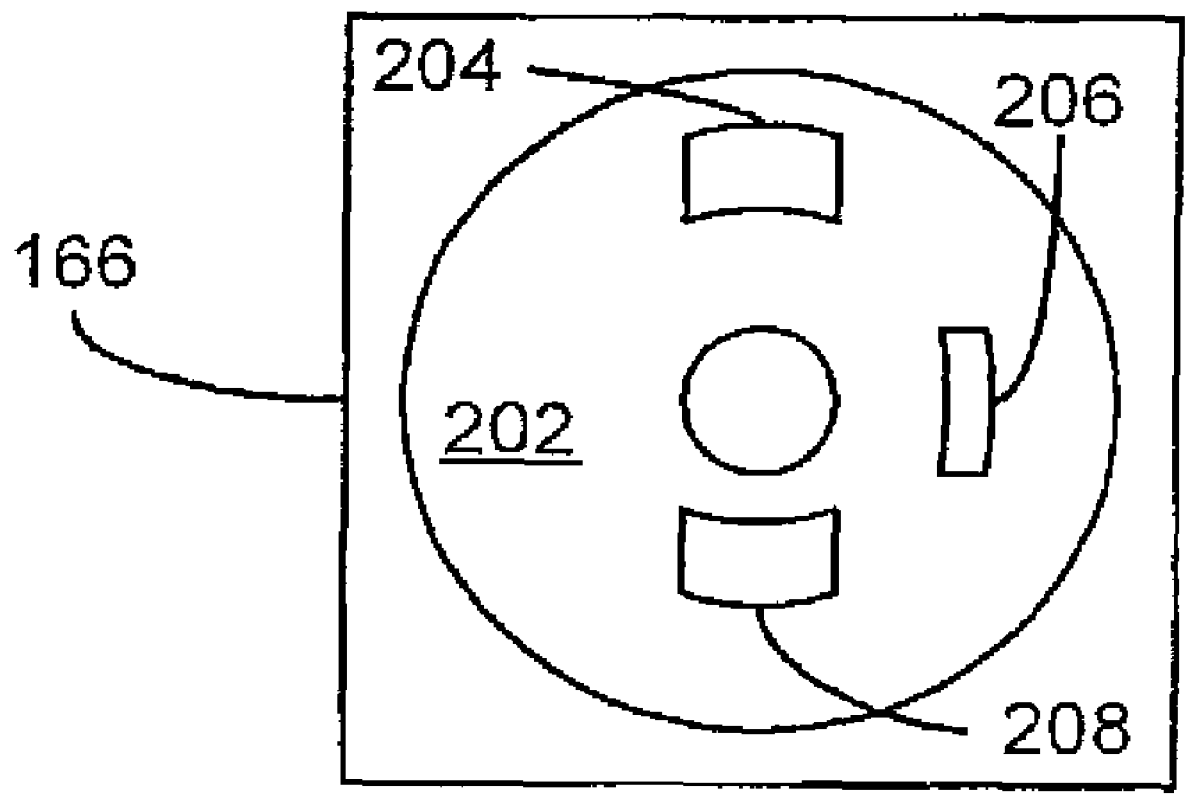
FIG. 2 is an illustration of a computer system storage medium including software code having instructions in accordance with an embodiment described herein.

The processes described herein may be implemented in suitable software code that may reside within ROM 122 or 162, RAM 124 or 164, or HD 126 or 166. In addition to those types of memories, the instructions of the software code may be contained on a data storage device having a separable computer system readable storage medium, such as a floppy diskette. FIG. 2 illustrates a combination of software code components 204, 206, and 208 that are embodied within a computer system readable medium 202, on HD 126. Alternatively, the instructions may be stored as software code components on a DASD array, magnetic tape, floppy diskette, optical storage device, or other appropriate computer system readable medium or storage device.

Figure 3:
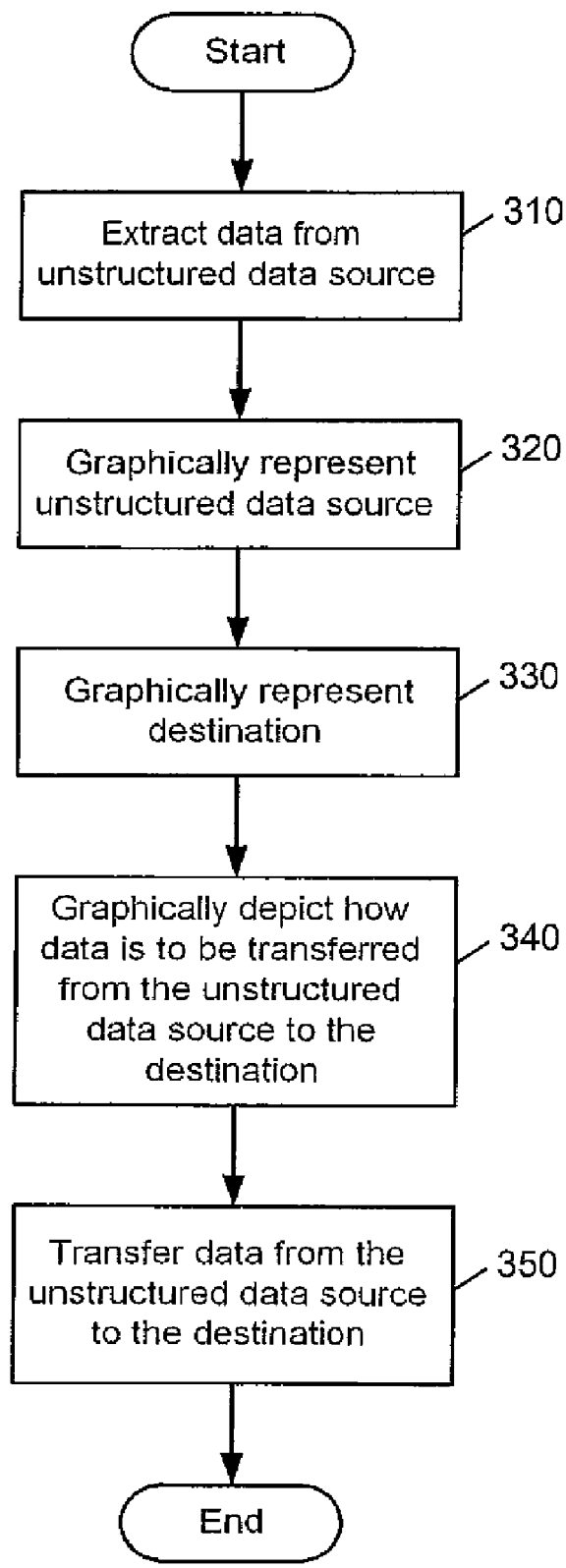
FIG. 3 is a flow diagram illustrating one embodiment of transferring data between an unstructured data source and a destination.

In an illustrative embodiment of the invention, the computer-executable instructions may be lines of compiled C++, Java, HTML, or any other programming or scripting code. Other architectures may be used. For example, the functions of the client computer 12 may be incorporated into the server computer 16, and vice versa. Further, other client computers (not shown) or other server computers (not shown) similar to client computer 12 and server computer 16, respectively, may also be connected to the network 14. FIG. 3 includes an illustration, in the form of a flowchart, of some of the structures and operations of such a software program.

Communications between the client computer 12 and the server computer 16 can be accomplished using electronic, optical, radio frequency signals, or other methods of communication. When a user is at the client computer 12, the client computer 12 may convert the signals to a human understandable form when sending a communication to the user and may convert input from a human to appropriate electronic, optical, radio frequency signals, etc. to be used by the client computer 12 or the server computer 16. Similarly, when an operator is at the server computer 16, the server computer 16 may convert the signals to a human understandable form when sending a communication to the user and may convert input from a human to appropriate electronic, optical, or radio frequency signals to be used by the server computer 16 or the client computer 12.

In many embodiments of the present invention, the method of the present invention will be embodied in computer executable instructions executing on a client computer 12. During execution the unstructured data source may be retrieved by a client computer 12 from a server computer 16 across a network 14. For example, by using a URL to locate a web based document at the associated address on the World Wide Web, and retrieving this web based document using a network protocol such as HTTP. The structured destination may be retrieved in the same manner, or may already be resident on client computer 12, for example as database 18. The data can then be extracted from the unstructured data source and transferred to the structured destination.

Attention is now directed to these various methods for transferring data between an unstructured source and a structured destination, and in particular, to methods designed to be used on web based documents.

FIG. 3 shows a flow diagram of one embodiment of a method for transferring data between an unstructured data source and a structured destination, which includes: extracting data from an unstructured data source 310, graphically representing the hierarchy of the data source 320, graphically representing a destination 330, graphically depicting how data is to be transferred from the data source to the destination 340, and transferring the data to the destination 350. This particular embodiment comprises first extracting data from an unstructured data source 310. An unstructured data source may be for example an HTML page with tables in it, an XML document with no DTD or Schema, multiple files containing HTML code, or any other type of web based document. Typically extracting data from the unstructured data source is done using an adapter.

Many of the methods described have an input document port which can take in many different things, sometimes preprocessing them to get the actual document from which data is to be extracted. If a string is supplied that does not look like a URL or file name, it will be considered to be the actual contents of the document. Data will be extracted from the document without storing the source of the document, because that source is not known (this may make resolution of links impossible). If a string is supplied that looks like a URL, the document at the location specified will be downloaded using a fetching mechanism. Data then will be extracted, remembering the URL so hyperlinks can be resolved.

Similarly to a URL, if a string is supplied that looks like a file name, the document in the named file will be used. Data will be extracted from the named file, remembering the file name so hyperlinks can be resolved.

As described, the process depicted in FIG. 3 also includes generating a graphic representation of an unstructured data source 320. This graphic depiction of the document from which data is extracted is based on the hierarchy of the data as it exists in the document itself, and the graphic representation created reflects this hierarchy. Graphically representing a destination 330 may be done in a similar manner. Often, graphically representing a destination will be less complicated, as the destination has a pre-defined structure.

In order to graphically depict how data is to be transferred from the data source to the destination 340, the graphic representation of the source and the destination are presented to a user. The user then associates portions (e.g., nodes) of the source's representation with portions (e.g., nodes) of the destination's representation. For instance, a graphical user interface (GUI) may be configured to allow the user to simply draw lines between the respective portions of the source and destination representations. Based upon the associations depicted with the GUI, data is transferred to the destination 350.

Figure 4:
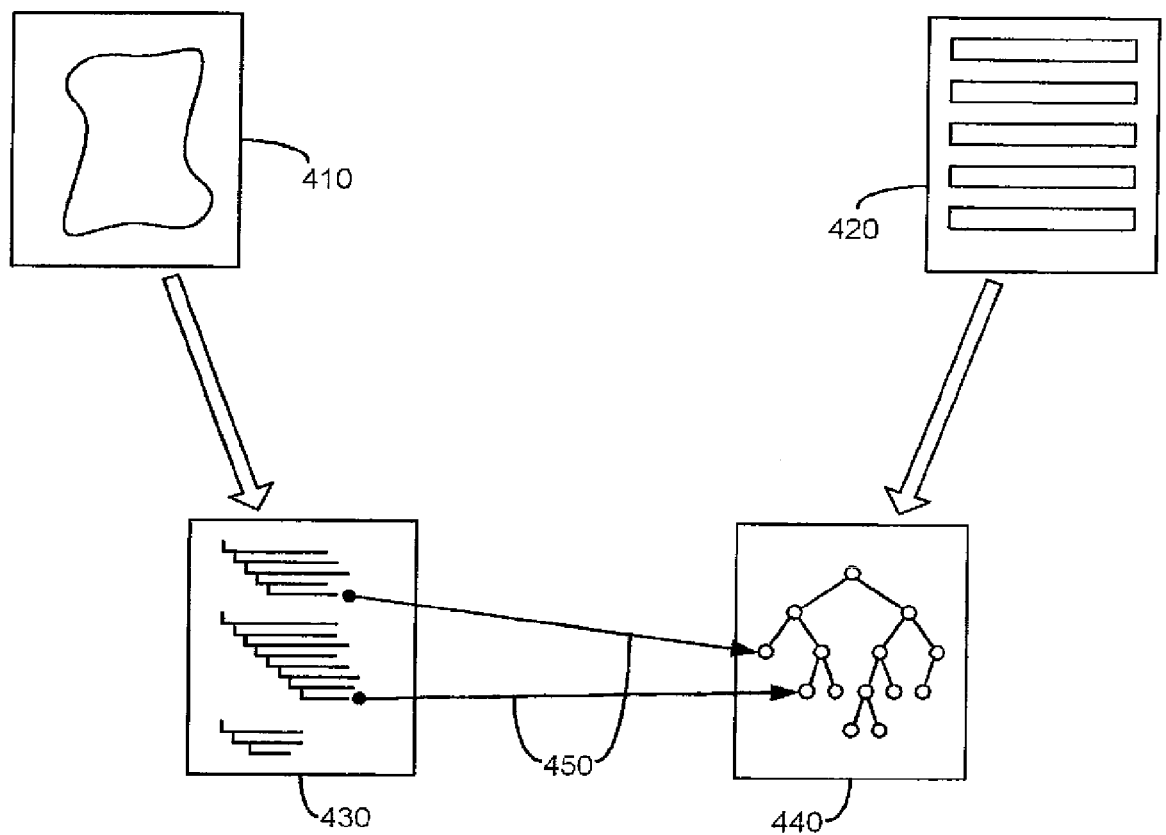
FIG. 4 is an illustration of transferring the data between an unstructured data source and a destination based upon graphical associations.

Graphically representing the hierarchy of the unstructured data source 320, graphically representing a destination 330, graphically depicting how data is to be transferred from the data source to the destination 340, and transferring the data to the destination 350, may be performed using the method further described and illustrated in FIG. 4.

Turning now to FIG. 4, the graphic representation 430 of unstructured data source 410 is created by taking the data that an adapter has extracted, and representing the hierarchical layout of that data. (The adapter will be explained in more detail below.) In some embodiments, this graphical representation 430 of the unstructured data source takes the form of a tree. The branches of the tree may represent the levels within the unstructured source document from which the represented data was extracted.

Similarly, one embodiment of the present method includes graphically representing a destination 330. In one embodiment, to create the graphical representation 440 an adapter takes as input a structured data source 420, and outputs a representation of the internal structure of the data of structured destination 420. Based on this output, graphical representation 440 of structured destination 420 is created. In many embodiments, the structured destination is graphically represented with a tree structure. This tree structure may reflect the relationships of data inherent in the structured destination.

After the graphical representations of unstructured data source 410 and structured destination 420 are generated, the graphical representations (430, 440) are presented to the user via the GUI. The user can then graphically depict how data is to be transferred from the data source 410 to the destination 420. In one embodiment, this is simply done by drawing lines (450) between the appropriate portions of the graphic representation of. the unstructured data source 430 and the graphic depiction of the destination 440. If the graphical representations of the unstructured data source and the destination comprise trees, this depiction is done by associating nodes of the tree which represents the unstructured data source 430 with nodes of the tree which represent the structured destination 440 utilizing arrows 450.

Based upon the graphical associations 450 between the representation 430 of unstructured data source 410, and the representation 440 of structured destination 420, data is then transferred from the unstructured source 410 to the associated locale within structured destination 420. In some embodiments, the method can perform transformations on the data as it is being transferred from the unstructured source 420 to the structured destination. For example, a Fahrenheit temperature stored in the unstructured data source 410 can be converted to a Celsius equivalent before the data is stored in the appropriate location in the structured destination 420.

Turning back now to FIG. 3, more details are now given regarding using an adapter to extract data from an unstructured data source 310. The adapter takes in unstructured content and outputs structured content. In many embodiments, the adapter does this by a process called 'pattern-matching'. The adapter may be pointed to a sample file that demonstrates the structure of the document to be pattern-matched, and using this sample file, the adapter can be tailored to the unstructured document from which data is to be extracted. From this sample file, one or more 'patterns' are created that describe features to look for in the unstructured source document, such as a table with a six columns, or the third occurrence of a level 2 heading in an HTML document. Then, one or more 'outputs' are created that describe which pieces of data are to be extracted from the document. When the adapter is utilized on the unstructured data source at runtime the adapter first matches the 'patterns' that have been created with the data in the unstructured document and extracts the data accordingly.

In one embodiment, the adapter is capable of pattern matching unstructured documents from many sources. The simplest source is a string input to the adapter. Another possible input to the adapter is an HTML file, or a Universal Resource Locator (URL). The adapter understands that when it is supplied a URL, it is not supposed to pattern-match the text of the URL, but rather to download the web based document to which the URL refers, and to pattern-match the downloaded document. This is done by finding the location on a network associated with the URL and downloading the corresponding web based documents related to that location.

This web based document may be a series of multiple files of HTML code which are linked together. In this case, the adapter will retain information regarding the URL so that any hyperlinks within the web based document can be resolved and the documents corresponding to those locations retrieved. In the case where the web-based document contains many files which are linked together, or of similar structure, the adapter can be used recursively to extract data from each of these files. The adapter may accomplish this recursive data extraction by resolving and following the hyperlinks contained in the web based document under analysis, effectively navigating the web based document and automatically extracting data as it navigates. This alleviates the problem of having to individually designate each file of a web based document for data extraction. This also avoids having to perform additional work to extract data from multiple files by, for example, having to write java script codes.

Additionally, the adapter can retrieve a limited subset of files associated with a web based document, pattern match those files, and subsequently fetch either another subset or the remainder of those files. This allows the adapter to limit the amount of network resources it utilizes when fetching the web-based document associated with a given URL. This also allows the adapter to optimize its performance by retrieving files from a web based document in parallel with extracting data from the files of the web-based document it has already received. This same capability allows the pages of a web-based document to be analyzed in the sequence they are retrieved by the adapter, as opposed to the order they appear in the web-based document. In many embodiments, to retrieve web-based documents associated with URLs, the adapter might use a URL fetching component built in to the adapter.

In the foregoing description, the invention has been described with reference to specific embodiments. One of ordinary skill in the art, however, appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

What is claimed is:

1. A method of transferring data between an unstructured data source document and a structured destination document, comprising:

displaying a graphical representation of the unstructured data source document and a graphical representation of the structured destination document to a user via a graphical user interface of a client computer, wherein the unstructured data source document resides at or is downloaded from a server computer and wherein the structured destination document resides at the client computer;

enabling the user to draw, via the graphical user interface of the computer, one or more lines between at least a portion of the graphical representation of the unstructured data source document and at least a portion of the graphical representation of the structured destination document, wherein each of the one or more lines has a first end point and a second end point, wherein the first end point points to a branch representing a level within the unstructured data source document, and wherein the second end point points to a node representing a locale within the structured destination document;

associating the level within the unstructured data source document with the locale within the structured destination document based upon the one or more lines drawn by the user to connect the branch representing the level within the unstructured data source document and the node representing the locale within the structured destination document utilizing the graphical user interface of the computer; and transferring data from the level within the unstructured data source document to the locale within the structured destination document.

2. The method according to claim 1, further comprising performing one or more transformations on the data as it is being transferred from the level within the unstructured data source document to the locale within the structured destination document.

3. The method according to claim 1, further comprising:
preprocessing an input received at the client computer; and
determining whether the input is a string, a file name, a Universal Resource Locator (URL), or a file.

4. The method according to claim 3, wherein the input is a string, further comprising:
extracting contents from the string; and
generating the graphical representation of the unstructured data source document based on the contents extracted from the string.

5. The method according to claim 3, wherein the input is a file name or a URL, further comprising:
accessing a document associated with the file name or the URL;
extracting contents from the document; and
generating the graphical representation of the unstructured data source document based on the contents extracted from the document.

6. The method according to claim 5, further comprising storing the file name or the URL.

7. The method according to claim 6, wherein the document is a web based document containing one or more hyperlinks, further comprising:
resolving the one or more hyperlinks within the web based document;
retrieving one or more files corresponding to the one or more hyperlinks; and
recursively extracting data from each of the one or more files.

8. The method according to claim 7, wherein the recursively extracting data step begins before the retrieving step is completed.

9. A non-transitory computer-readable storage medium storing computer instructions translatable by one or more processors to perform a method of transferring data between an unstructured data source document and a structured destination document, the method comprising:
displaying a graphical representation of the unstructured data source document and a graphical representation of the structured destination document to a user via a graphical user interface of a client computer, wherein the unstructured data source document resides at or is downloaded from a server computer and wherein the structured destination document resides at the client computer;
enabling the user to draw, via the graphical user interface of the computer, one or more lines between at least a portion of the graphical representation of the unstructured data source document and at least a portion of the graphical representation of the structured destination document, wherein each of the one or more lines has a first end point and a second end point, wherein the first end point points to a branch representing a level within the unstructured data source document, and wherein the second end point points to a node representing a locale within the structured destination document;
associating the level within the unstructured data source document with the locale within the structured destination document based upon the one or more lines drawn by the user to connect the branch representing the level within the unstructured data source document and the node representing the locale within the structured destination document utilizing the graphical user interface of the computer; and
transferring data from the level within the unstructured data source document to the locale within the structured destination document.

10. The non-transitory computer-readable storage medium of claim 9, wherein the computer instructions are further translatable by the one or more processors to perform one or more transformations on the data as it is being transferred from the level within the unstructured data source document to the locale within the structured destination document.

11. The non-transitory computer-readable storage medium of claim 9, wherein the computer instructions are further translatable by the one or more processors to:
preprocess an input received at the client computer; and
determine whether the input is a string, a file name, a Universal Resource Locator (URL), or a file.

12. The non-transitory computer-readable storage medium of claim 11, wherein the computer instructions are further translatable by the one or more processors to:
extract contents from the string; and
generate the graphical representation of the unstructured data source document based on the contents extracted from the string.

13. The non-transitory computer-readable storage medium of claim 11, wherein the computer instructions are further translatable by the one or more processors to:
store the file name or the URL;
access a document associated with the file name or the URL;
extract contents from the document; and
generate the graphical representation of the unstructured data source document based on the contents extracted from the document.

14. The non-transitory computer-readable storage medium of claim 13, wherein the document is a web based document containing one or more hyperlinks and wherein the computer instructions are further translatable by the one or more processors to:
resolve the one or more hyperlinks within the web based document;
retrieve one or more files corresponding to the one or more hyperlinks; and
recursively extract data from each of the one or more files.

15. The non-transitory computer-readable storage medium of claim 14, wherein the computer instructions are further translatable by the one or more processors to perform at least partially in parallel retrieving the one or more files corresponding to the one or more hyperlinks and recursively extracting the data from each of the one or more files.

16. A system for transferring data between an unstructured data source document and a structured destination document, comprising:
a computer having:
a graphical user interface;
one or more processors; and
one or more non-transitory computer-readable storage media storing computer instructions translatable by the one or more processors to:
display a graphical representation of the unstructured data source document and a graphical representation of the structured destination document to a user via the graphical user interface of the computer;
enable the user to draw, via the graphical user interface of the computer, one or more lines between at least a portion of the graphical representation of the unstructured data source document and at least a portion of the graphical representation of the structured destination document, wherein each of the one or more lines has a first end point and a second end point, wherein the first end point points to a branch representing a level within the unstructured data source document, and wherein the second end point points to a node representing a locale within the structured destination document;

associate the level within the unstructured data source document with the locale within the structured destination document based upon the one or more lines drawn by the user to connect the branch representing the level within the unstructured data source document and the node representing the locale within the structured destination document utilizing the graphical user interface of the computer; and transfer data from the level within the unstructured data source document to the locale within the structured destination document.

17. The system of claim 16, wherein the computer instructions are further translatable by the one or more processors to perform one or more transformations on the data as it is being transferred from the level within the unstructured data source document to the locale within the structured destination document.

18. The system of claim 16, wherein the computer instructions are further translatable by the one or more processors to:
preprocess an input received at the computer; and
determine whether the input is a string, a file, a file name, or a Universal Resource Locator (URL).

19. The system of claim 18, wherein the computer instructions are further translatable by the one or more processors to:
extract contents from the string, the file, or a document associated with the file name or the URL; and
generate the graphical representation of the unstructured data source document based on the extracted contents.

20. The system of claim 19, wherein the document is a web based document containing one or more hyperlinks and wherein the computer instructions are further translatable by the one or more processors to:
resolve the one or more hyperlinks within the web based document;
retrieve one or more files corresponding to the one or more hyperlinks; and
recursively extract data from each of the one or more files.

* * * * *